US007485795B2

(12) United States Patent
Taruguchi

(10) Patent No.: US 7,485,795 B2
(45) Date of Patent: Feb. 3, 2009

(54) METHOD AND DEVICE FOR STORING MAIN INFORMATION WITH ASSOCIATED ADDITIONAL INFORMATION INCORPORATED THEREIN

(75) Inventor: Hideaki Taruguchi, Hamamatsu (JP)

(73) Assignee: Yamaha Corporation, Hamamatsu-Shi (JP)

( * ) Notice: Subject to any disclaimer, the term of this patent is extended or adjusted under 35 U.S.C. 154(b) by 520 days.

(21) Appl. No.: 11/081,304

(22) Filed: Mar. 15, 2005

(65) Prior Publication Data

US 2005/0166067 A1    Jul. 28, 2005

Related U.S. Application Data

(62) Division of application No. 09/789,273, filed on Feb. 20, 2001, now Pat. No. 7,015,388, which is a division of application No. 08/882,132, filed on Jun. 25, 1997, now Pat. No. 6,209,096.

(30) Foreign Application Priority Data

Jul. 2, 1996  (JP)  ................................. 8-191528

(51) Int. Cl.
G04B 13/00    (2006.01)
G10H 7/00     (2006.01)

(52) U.S. Cl. ............................. 84/609; 84/602; 84/616; 84/622

(58) Field of Classification Search ........... 84/600–609, 84/615–616, 618, 622–625, 649, 653–654, 84/656, 659–660
See application file for complete search history.

(56) References Cited

U.S. PATENT DOCUMENTS

| 4,939,515 A | 7/1990 | Adelson |
| 5,319,735 A | 6/1994 | Preuss et al. |
| 5,530,751 A | 6/1996 | Morris |
| 5,646,997 A | 7/1997 | Barton |
| 6,209,096 B1 | 3/2001 | Taruguchi |
| 6,359,573 B1 | 3/2002 | Taruguchi et al. |

FOREIGN PATENT DOCUMENTS

EP    418 964 A1    3/1991

(Continued)

OTHER PUBLICATIONS

"A Digital Watermark" R. G. van Schyndel et al., Dept. of Phys., Monash University, Clayton, VIC, Australia, Image Processing, 1994, Proceedings. ICIP-94 International conference, pp. 88-90, vol. 2, Nov. 13-16, 1994.

(Continued)

Primary Examiner—Marlon T Fletcher
(74) Attorney, Agent, or Firm—Morrison & Foerster LLP

(57) ABSTRACT

To store main information with associated additional information incorporated therein, data constituting the additional information is divided into a plurality of small-size data pieces of, e.g., one bit. Then, the respective values of particular ones of predetermined data units (e.g., bytes) constituting the main information are subjected to arithmetic operations in accordance with a predetermined algorithm containing the value of each of the data pieces as a parameter. In this way, the respective values of the particular data units in the main information are modulated in accordance with the values of the individual data pieces in the additional information; at that time, only some of the data unit values are altered with the others left unaltered. The thus-arithmetically-operated main information is stored into a storage. For reproduction of the additional information, the stored main information is read out, and the individual data pieces are reproduced from the particular data units by inversely executing the algorithm. For example, the main information includes MIDI key-on event data, program change data or control change data, waveform data, or image data, and the additional information includes letter data representative of the name of an author of a music piece in question, title of the music piece or title of an image and data representative of a data format employed.

44 Claims, 6 Drawing Sheets

FOREIGN PATENT DOCUMENTS

| | | |
|---|---|---|
| EP | 0 441 702 A1 | 8/1991 |
| EP | 0 493 091 A1 | 7/1992 |
| EP | 0 581 317 A2 | 2/1994 |
| EP | 0 690 595 A1 | 1/1996 |
| EP | 750 423 A2 | 12/1996 |
| EP | 751 515 A2 | 1/1997 |
| EP | 0 766 468 A2 | 4/1997 |
| GB | 2 145 856 | 4/1985 |
| GB | 2196167 | 4/1988 |
| WO | WO 89/08915 | 9/1989 |
| WO | WO 95/14289 | 5/1995 |
| WO | WO 95/20291 | 7/1995 |
| WO | WO 96/21290 | 7/1996 |
| WO | WO 96/26494 | 8/1996 |
| WO | WO 96/27259 | 9/1996 |
| WO | WO 97/26733 | 7/1997 |

OTHER PUBLICATIONS

"Dice and Digimarc File for Patients for 'Scatter-Gun' Electronic Watermark Technology", Computergram international, pCGN10040014, Oct. 4, 1995 (one page).

Laurence Boney et al., "Digital Watermarks for Audio Signals", Proceedings of the 1996 International Conference on Multimedia Computing and Systems, pp. 473-480, Jun. 17-23, 1996, Hiroshima, JP.

METHOD AND DEVICE FOR STORING MAIN INFORMATION WITH ASSOCIATED ADDITIONAL INFORMATION INCORPORATED THEREIN

CROSS-REFERENCE TO RELATED APPLICATIONS

This application is a division of U.S. application Ser. No. 09/789,273 filed on Feb. 20, 2001, which in turn is a division of U.S. application Ser. No. 08/882,132 filed Jun. 25, 1997, now U.S. Pat. No. 6,209,096, and in which both applications are specifically incorporated herein, in their entirety, by reference.

BACKGROUND OF THE INVENTION

The present invention relates generally to methods and devices which simultaneously store, into an electronic storage medium, main information such as tone control information (MIDI data) and supplementary or additional information associated with the main information, and reproduce the main information and additional information thus stored in the electronic storage medium. The present invention also relates to electronic storage media for storing therein such main and additional information or software programs to implement such a method. More particularly, the present invention relates to a method and device which allow main information to be stored with associated additional information incorporated therein.

In recent years, it has become possible for us to readily create music data, image data, waveform data, etc. and make various alterations to these data by use of a personal computer. Thus, using a personal computer, we can freely read out music data, image data, waveform data, etc. recorded on a commercially available storage medium, such as a FD (Floppy Disk), CD-ROM (Compact-Disk-Read-Only-Memory) and LD (Laser Disk), and also freely make various alterations to the data.

However, because the copyright on the data recorded on a commercially available CD-ROM or LD is mostly owned by the distributor or manufacturer of the storage medium, freely altering the recorded data would constitute an infringement of the copyright and hence should not be permitted.

At present, in an attempt obviate such a copyright infringement, copyright indication data specifying who owns the copyright on main data, such as music data, image data or waveform data, recorded in a main data recording section of a CD-ROM or LD is attached, as additional information, to a header section of the storage medium, so as to identify the copyright holder. Other than such copyright indication data, the additional information sometimes include information indicative of the title of the music data, image data and waveform data, or recording-format information that indicates a particular sort of data compression technique used for compressing the data.

However, because the data can be freely rewritten or altered by use of a personal computer or otherwise, a significant problem may be encountered that any of the additional information, such as the copyright indication data, is readily deleted, altered or rewritten on purpose or by mistake. In particular, where such additional information is stored in the header section, the additional information may be deleted or altered quite easily.

Further, with the recent advancement of communication networks, there could arise another significant problem that music data, image data or waveform data with the copyright indication data deleted or alerted in an unfair manner is widely distributed via communication networks. Still another significant problem is that if the additional information on the data recording format used is deleted, the image data, waveform data or the like can not be reproduced at all.

SUMMARY OF THE INVENTION

It is therefore an object of the present invention to provide a method and device which, even when additional information attached to main information such as music data, image data or waveform data is deleted or altered, allows the additional information to be appropriately reproduced.

In order to accomplish the above-mentioned object, the present invention provides a novel method of storing constituent data of first information along with constituent data of second information. Typically, the constituent data of first information comprises a plurality of predetermined data units. The method of the present invention comprises the steps of: dividing at least part of the constituent data of second information into a plurality of small-size data pieces; arithmetically operating respective values of particular ones of the predetermined data units of the first information in accordance with a predetermined algorithm containing a value of each of the data pieces as a parameter; and storing the data of first information including the arithmetically-operated particular data units, whereby the constituent data of first information is stored with at least part of the constituent data of second information incorporated therein.

The first information corresponds to "main information", which may, for example, be MIDI-format musical performance information. The first information has a relatively large volume as a whole and is normally stored in a predetermined main data storage area of a memory. The second information corresponds to "additional information", which may, for example, be copyright indication information attached to the first information or musical performance information stored in the main data storage area and typically has a smaller volume than the first information. For example, according to the present invention, the first information is stored in the main data storage area, and the second information is incorporated or mixed in constituent data of the first information and stored therewith in the main data storage area rather than in the header area. In this case, either part or the whole of the second or additional information may be incorporated in the constituent data of the first information.

In the present invention, either part or the whole of the constituent data of the second information is divided into a plurality of small-size data pieces (each of which may, for example, be of one bit or two or more bits). The constituent data of the first information comprises a plurality of predetermined data units. Because the value of one particular data unit is modulated in accordance with one of the data piece so that the value of the data piece is incorporated in the value of the particular data unit, each "data unit" of the first information is a unit in which one data piece value is to be incorporated. Therefore, the size of each "data unit" of the first information can be optionally chosen in implementing the present invention and may, for example, be one byte or two or more bytes.

The respective values of the individual data pieces are incorporated in particular ones of the data units of the first information. For example, where the second information has 16 data pieces, the respective values of these data pieces are incorporated into 16 particular data units. This data piece incorporation in the particular data units is conducted by an arithmetic operation to modulate the values of the particular data units in accordance with the values of the data piece in accordance with a predetermined algorithm (only some of the data unit values may be altered with the others left unaltered). As a result, the data pieces of the second information are dispersedly incorporated or mixed in the constituent data of the first information, and these data of the first information with the data pieces of the second information dispersedly incorporated therein are stored into a suitable memory.

In order to reproduce the second information from the constituent data of the first information, the method of the present invention may further comprise the steps of: reading out the data of the first information stored by the step of storing; and reproducing the plurality of small-size data pieces from the particular data units of the first information read out by the step of reading, wherein at least part of the constituent data of second information is reproduced by combining the data pieces reproduced by the step of reproducing. Basically, the reproduction of the data pieces of the second information from the particular data units of the first information can be effected by inversely executing the predetermined algorithm.

Because the second or additional information is mixedly hidden in the first information in the above-mentioned manner, it is difficult or impossible for malicious users to delete or alter the second information. In addition, even when the first information is copied in an unfair manner, the second information can be appropriately restored, so that the unfair copying can be readily identified.

The predetermined algorithm includes the steps of: determining a first variable corresponding to the values of the data pieces; determining a second variable on the basis of an addition or subtraction between a predetermined number of the data units of the first information including at least one of the particular data units; generating an operating value on the basis of a correlation between the first variable and the second variable; and arithmetically operating the value of the particular data unit with the operating value. As an example, the first variable is a first flag indicating an inverted value of the value of a one-bit data piece, while the second flag is a second flag indicating a value depending on whether a sum or difference between a predetermined number of data units of the first information including at least one of the particular data units (or the value of only a selected one of the particular data units) is an even number or an odd number. Generating an operating value on the basis of a correlation between the first and second variables is equivalent to comparing the two flags and then generating an operating value, "0" or "1", depending on agreement or disagreement between the compared two flags. Thus, the particular data unit values are arithmetically operated with "0" or "1" and thereby modulated (namely, only some of the data unit values may be altered with the others left unaltered). In such a case, the data piece values of the second information can be easily reproduced on the basis of a determination as to whether the data unit values of the first information are an even number or an odd number.

For example, the main information includes MIDI key-on event data, program change data or control change data, waveform data, or image data. The additional information includes letter data representative of the name of an author of a music piece in question, title of the music piece or title of an image and data representative of a data format employed, as well as other data such as a cryptogram, key information, ID, password and latest news. As an example, the data pieces of the additional information may be incorporated in velocity data contained in MIDI key-on event data so that some of the least significant or lowermost bits of the velocity data are altered with the others left unaltered. In this way, the additional information is recorded dispersedly in MIDI data groups. In the case where the main information comprises MIDI data, it is desirable that the data unit to be altered be velocity data or duration time data, because these data need not be so accurate. Namely, a slight alteration of these data could hardly be perceived aurally by human listeners. Further, in the case where the main information comprises waveform data, the least significant bit of the waveform data itself may be altered. Similarly, in the case where the main information comprises image data, the least significant bit of the waveform data itself may be altered. Therefore, when the main information with the additional information incorporated therein is read out for reproduction, it may be reproduced directly, i.e., without removing the data pieces of the additional information therefrom. Of course, if desired, the main information may be reproduced after removal of the incorporated additional information.

To accomplish the above-mentioned object, a second aspect of the present invention provides another novel method of storing constituent data of first information along with constituent data of second information, the constituent data of first information comprising a plurality of predetermined data units. This method comprises the steps of: dividing at least part of the constituent data of second information into a plurality of small-size data pieces; for each of predetermined groups of said constituent data of first information, arithmetically operating respective values of particular ones of the predetermined data units in accordance with a predetermined algorithm containing a value of each of the data pieces as a parameter; and storing the data of the first information including the arithmetically-operated particular data units, whereby the constituent data of first information is stored with at least part of the constituent data of second information incorporated in the data of the individual groups.

According to the second aspect, the second information, divided into a plurality of small-size data pieces, are incorporated, dispersedly and redundantly, in a plurality of constituent data groups of the first information and stored therewith. To reproduce the stored data, it is only sufficient that the plurality of data pieces be reproduced from the particular data units for at least one of the groups. Because of the dispersed and redundant incorporation of the second information, it is only necessary to reproduce the second information incorporated in any one of the data groups of the first information. Therefore, even when the data contents of one of the groups in the first information is altered in such an unfair manner that the second information can not be reproduced from that data group, it is only sufficient that the second information incorporated in another data group that be maintained unaltered.

The grouping of the constituent data in the first information may be made in accordance with the data characteristics of the first information. For instance, in the case where the first information comprises MIDI data, the data pieces of the second information are incorporated dispersedly in the data group of the first information belonging to a first MIDI channel, and the same data pieces of the second information are incorporated dispersedly in the data group of the first information belonging to a second MIDI channel, for redundant purposes. Thus, even when MIDI data has been altered or substituted unfairly by a malicious user, the second information can be appropriately reproduced from an unaltered data piece incorporated in the MIDI data of another channel. In this case, the algorithm used to incorporate the data pieces of the second information may be made different for each of the groups.

BRIEF DESCRIPTION OF THE DRAWINGS

For better understanding of the above and other features of the present invention, the preferred embodiments of the invention will be described in greater detail below with reference to the accompanying drawings, in which.

DETAILED DESCRIPTION OF THE PREFERRED EMBODIMENTS

Figure 2:
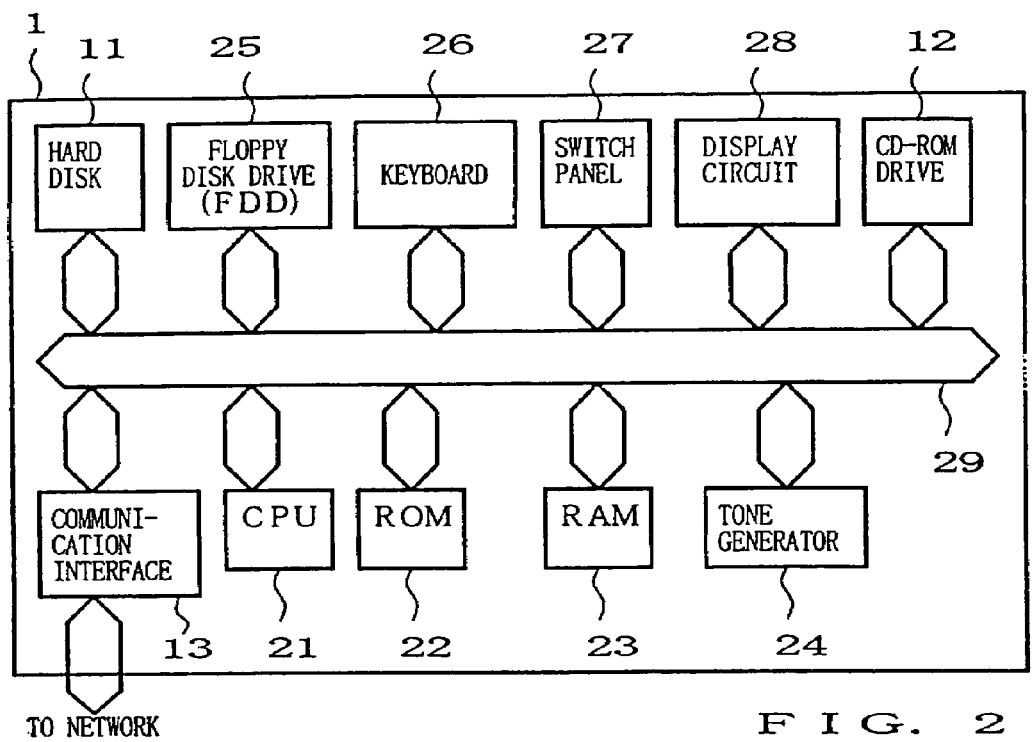
FIG. 2 is a block diagram illustrating a general hardware structure of an electronic musical instrument that is designed to operate as the electronic information processing system of the present invention.

FIG. 2 is a block diagram illustrating a general hardware structure of an electronic musical instrument that operates as an electronic information processing system of the present invention. This electronic musical instrument 1 comprises a CPU 21, a ROM 22, a RAM 23, a tone generator 24, a floppy disk drive 25, a keyboard 26, a switch panel 27 and a display circuit 28.

The CPU 21 controls overall operation of the electronic musical instrument 1 on the basis of various programs and data stored in the ROM 22 and RAM 23 as well as tone control information (MIDI data) received via the floppy disk drive 25. The CPU 21 also works to store, into memory, MIDI data with associated additional information scatteringly or dispersedly incorporate additional information therein, fetch MIDI data with such additional information dispersedly incorporated therein, detect the additional information from among the MIDI data. Whereas this embodiment is described in relation to the case where the floppy disk drive 25 is employed, any other disk drive than the floppy disk drive 25, such as a MO (Magneto Optical) disk drive, PD (Phase change Disk) drive and CD-ROM drive, may be employed in the electronic musical instrument 1. The CPU 21 supplies the tone generator 24 with MIDI data received via the floppy disk drive 25 or generated in response to key depressing operation by a human player so that the tone generator 24 generates a tone on the basis of the supplied MIDI data. Alternatively, tone generating processing may be executed by use of an external tone generator. Although not specifically shown, other peripherals than those shown in FIG. 2, such as a timer, display and sound system, are connected to the CPU 21 via a data and address bus 29.

The ROM 22, which is a read-only memory (ROM), has prestored therein various programs (including system and operating programs) and various data.

The RAM 23, which is for temporarily storing data generated as the CPU 21 executes a program, is provided in predetermined address regions of a random access memory (RAM) and used as registers, flags, buffers, tables, et.

Further, although not specifically shown, a hard disk device or the like may be connected to the CPU 21 so as to store therein various data, such as automatic performance data and chord progression data, and the operating program. By prestoring the operating programs in the hard disk device rather than in the ROM 22 and loading the operating program into the RAM 23, the CPU 21 can operate in exactly the same way as where the operating program is stored in the ROM 22. This feature greatly facilitates version-up of the operating program, addition of a new operating program, etc. A CD-ROM may be used as a removably-attachable external recording medium for recording various data, such as automatic performance data, chord progression data, tone waveform data and image data, and an optional operating program. Such an operating program and data stored in the CD-ROM can be read out by a CD-ROM drive (not shown) to be then transferred for storage in the hard disk device. This facilitates installation and version-up of the operating program.

A communication interface 13 may be connected to the data and bus 29 so that the electronic musical instrument 1 can be connected via the interface 13 to various communication networks such as a LAN (Local Area Network) and Internet to exchange data with an appropriate sever computer. Thus, in a situation where the operating program and various data are not contained in the hard disk device 11, these operating program and data can be downloaded from the server computer. In such a case, the electronic musical instrument 1, which is a "client" tone generating device, sends a command to request the server computer to download the operating program and various data by way of the communication interface and communication network. In response to the command, the server computer delivers the requested operating program and data to the electronic musical instrument 1 via the communication network. The electronic musical instrument 1 receives the operating program and data via the communication interface 13 and accumulatively store them into the hard disk device. In this way, the necessary downloading of the operating program and various data is completed.

The tone generator 24, which is capable of simultaneously generating tone signals in a plurality of channels, receives tone control information (MIDI data including a note-on or note-off instruction, velocity data, pitch data and tone color number) and generates a tone signal based on these data. The tone generation channels to simultaneously generate a plurality of tone signals in the tone generator 24 may be implemented by using a single circuit on a time-divisional basis or by providing a separate circuit for each of the channels.

Any tone signal generation method may be used in the tone generator 24 depending on an application intended. For example, any conventionally known tone signal generation method may be used such as: the memory readout method where tone waveform sample value data stored in a waveform memory are sequentially read out in accordance with address data that vary in correspondence to the pitch of a tone to be generated; the FM method where tone waveform sample value data are obtained by performing predetermined frequency modulation operations using the above-mentioned address data as phase angle parameter data; or the AM method where tone waveform sample value data are obtained by performing predetermined amplitude modulation operations using the above-mentioned address data as phase angle parameter data. Other than the above-mentioned, the tone generator 24 may also use the physical model method where a tone waveform is synthesized by algorithms simulating a tone generation principle of a natural musical instrument; the harmonics synthesis method where a tone waveform is synthesized by adding a plurality of harmonics to a fundamental wave; the formant synthesis method where a tone waveform is synthesized by use of a formant waveform having a specific spectral distribution; or the analog synthesizer method using VCO, VCF and VCA. Further, the tone generator 24 may be implemented by a combined use of a DSP and microprograms or of a CPU and software programs, rather than by dedicated hardware.

Each tone signal generated by the tone generator 24 is supplied to the sound system (not shown), including amplifiers and speakers, for audible reproduction or sounding. If necessary, an effector may be provided between the tone generator 24 and the sound system.

The keyboard 26 includes a plurality of keys for selecting a pitch of a tone to be generated and a plurality of key switches provided in corresponding relations to the keys. When one of the keys is newly depressed, the keyboard 26 outputs key-on event data including a key code corresponding to the depressed key, while when one of the keys is newly released, the keyboard 26 outputs key-off event data including a key code corresponding to the released key. Also, the keyboard 26 detects a key-depressing velocity or force when one of the keys is newly depressed, so as to generate touch data and then output it as velocity data. Whereas the embodiment will be described as employing the keyboard 26 since it is a fundamental musical performance operator device relatively easy to understand, any other performance operator device may be employed.

The switch panel 27 is provided with a plurality of switches or operators for selecting, setting and controlling various behaviors of the electronic musical instrument 1.

The display circuit 28 visually displays various information, such as controlling conditions of the CPU 21 and currently set data, on a monitor screen (not shown). Specifically, this display circuit 28 in the present embodiment visually displays copyright indication data, title of a music piece in question, date of creation of the music piece, lyrics of the music piece, latest news, model name of the device (hardware model name), text data such as ID data, etc. Note that the electronic musical instrument 1 need not necessarily be constructed as a dedicated musical instrument but may be one performing the function of a musical instrument using a personal computer or otherwise.

Now, a description will be made about a case where the electronic information processing system operates as an electronic information imparting device.

Figure 3:
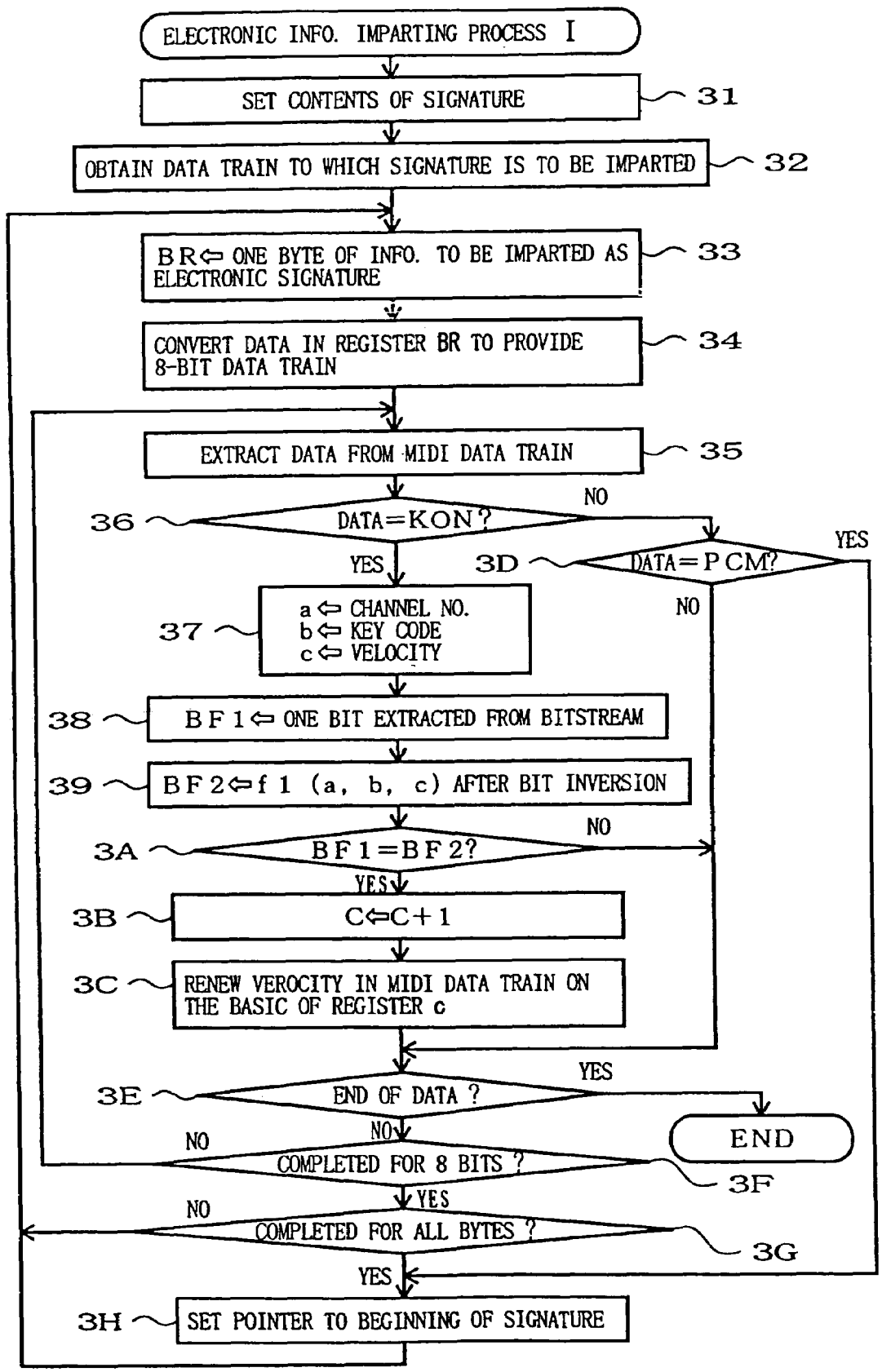
FIG. 3 is a flowchart showing an example of the electronic information imparting process executed in the case where the electronic musical instrument of FIG. 2 operates as the electronic information processing system.

FIG. 3 is a flowchart showing an example of an electronic information imparting process ("electronic information imparting process I") executed in the case where the electronic musical instrument 1 operates as the electronic information imparting device. As will be described in detail below, the electronic musical instrument 1, in this case, dispersedly attach electronic signature data (i.e., copyright indication data) to MIDI data, read out from a floppy disk via the floppy disk drive 25, as part of its header information. Note that the MIDI data having the electronic signature data attached thereto may be re-recorded onto the same floppy disk or another storage medium or transferred to another desired destination.

First, at step 31 of the electronic information imparting process, contents of the electronic signature data (copyright indication data) to be dispersedly written in the MIDI data train are designated. If characters such as "COPYRIGHT-ΔYMHΔ1996" are to be dispersedly written in the MIDI data train as the copyright indication data, these characters are designated at step 31 using the switch panel 27. In this instance, the mark "Δ" represents a space.

Once the electronic signature, i.e., character train to be written has been designated at step 31 in the above-mentioned manner, a data train relating to the electronic signature is obtained at step 32. For example, if the above-noted characters "COPYRIGHTΔYMHΔ1996" have been entered using the switch panel 27, then they are converted into a data train of letters and marks in ASCII (American Standard Code for Information Interchange) codes. Thus, in this instance, an ASCII data train is obtained which comprises "43H" ("C"), "4FH" ("O"), "50H" ("P"), "59H" ("Y"), "52H" ("R"), "49H" ("I"), "47H" ("G"), "48H" ("H"), "54H" ("T"), "20H" ("Δ"), "59H" ("Y"), "4DH" ("M"), "48H" ("H"), "20H" ("Δ"), "31H" ("1"), "39H" ("9"), "39H" ("9") and "36H" ("6").

Then, at step 33, one byte of information to be imparted as the electronic signature, i.e., the ASCII data train obtained at step 32 is stored into a byte register BR. At next step 34, each bit of the ASCII data stored in the byte register BR is inverted to provide another bit stream of eight bits. For example, if "Y" (="59H") is stored in the byte register BR—the letter "H" indicates that the bit stream is in hexadecimal representation—, it becomes a bit stream "01011001B" (=89D) as denoted at block (F) of FIG. 1; the letter "D" after the numerical values indicates that the bit stream is in decimal representation. This bit stream is converted, through the bit inversion of step 34, into another bit stream "10100110B" (="166D") as denoted at block (E) of FIG. 1, the letter "B" after the numerical values indicates that the bit stream is in binary representation.

At next step 35, various MIDI data, such as key-on event data, program change data and control change data, are sequentially extracted out of the MIDI data train (MIDI File: SMF). The MIDI data train basically comprises key-on event data including a key-on status byte, key code byte and velocity byte, program change data and control change data as known in the art, and hence step 35 sequentially reads out or extracts these data in a sequential manner.

Then, a determination is made at step 36 as to whether the currently extracted data is key-on event data KON. If answered in the affirmative, the program proceeds to next step 37; otherwise, the program branches to step 3D. Thus, if the MIDI data extracted at step 35 is key-on event data KON, there is obtained a MIDI data train including the key-on event data as denoted at block (A) of FIG. 1; this MIDI data train SMF1 comprises combinations of duration time data D and key-on event data.

At step 37, respective data of the individual bytes of the key-on event data are stored into corresponding registers a, b and c; that is, a channel number in the key-on status byte is stored into register a, a key code in the first data byte (key code byte) into register b, and velocity data in the second data byte (velocity byte) into register c.

At next step 38, one bit data is extracted, one after another, from the beginning of the bit stream created at step 34 and stored into a first bit flag BF1.

Figure 1:
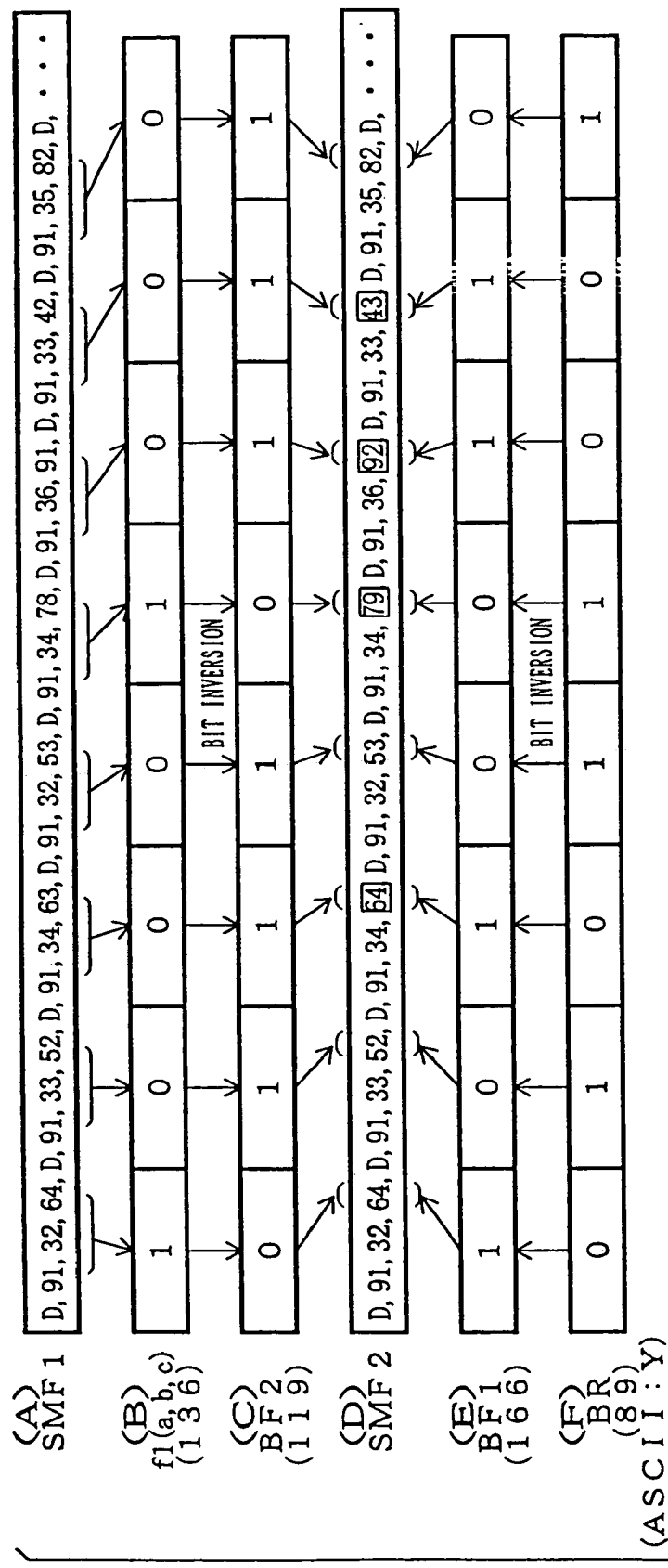
FIG. 1 is a diagram illustratively showing a specific manner in which data are converted via electronic information imparting and detecting processes in an electronic information processing system according to the present invention.
Figure 1:
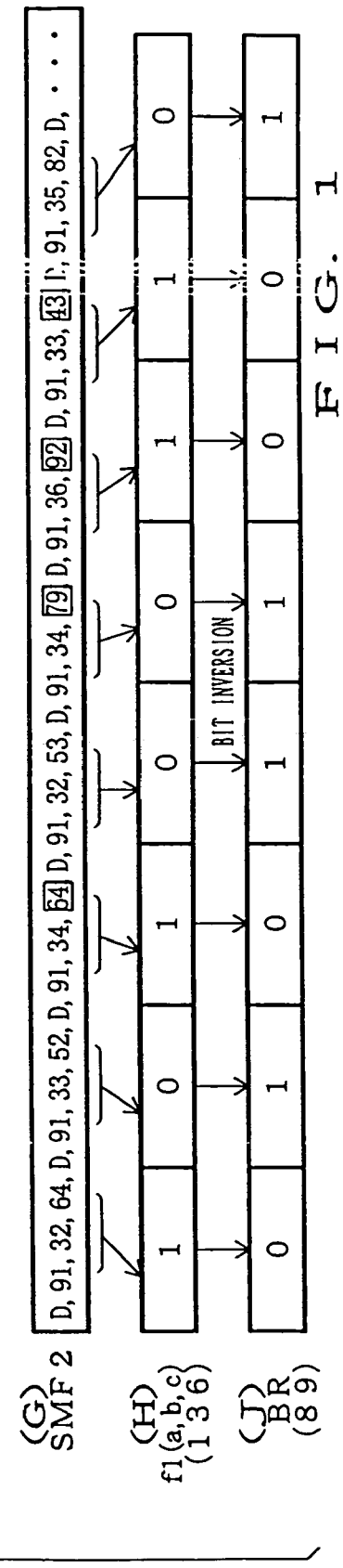

At following step 39, the value stored in each of registers a, b and c is subjected to an arithmetic operation, and each of the operation results is then stored into a second bit flag BF2 after being subjected to a predetrmined bit inversion operation. In this embodiment, modulo 2 of a sum of the values stored in individual registers a, b and c is set as a predetermined function; that is, function f1(a, b, c)=(a+b+c) mod 2. For example, in the case of the key-on event MIDI data train SMF1 as denoted at block (A) of FIG. 1, data corresponding to a single letter is created with eight key-on event data. By arithmetically operating the individual key-on data with the predetermined function f1(a, b, c), there is obtained a data train as denoted at block (B) of FIG. 1. Namely, if the sum (a+b+c) is an even number, a value "0" is given, while if the sum (a+b+c) is an odd number, a value "1" is given. Thus, the resultant inverted data as denoted at block (C) of FIG. 1 are stored into the second bit flag BF2.

At next step 3A, a determination is made as to whether the values set in the first and second bit flags BF1 and BF2 at step 39 are equal to each other. With an affirmative (YES) determination, operations at following steps 3B and 3C are executed, while with a negative (NO) determination, the program jumps to step 3E.

Now that the values set into the first and second bit flags BF1 and BF2 are equal to each other as determined at step 3A, "1" is added, at step 3B, to the least significant (lowermost) bit of the value set in register c, i.e., the velocity data. Then, at step 3C, the velocity value of the key-on event data in the MIDI data train is renewed on the basis of the value set in register c; that is, the velocity value is incremented by one. In the case of FIG. 1, if the third, fifth, sixth and seventh values set in the first bit flag BF1 are equal to the corresponding values set in the second bit flag BF2, an affirmative determination results at step 3A, so that the velocity values of the third, fifth, sixth and seventh key-on event data are each incremented by one. More specifically, the velocity value "63" of the third key-on event data is incremented to "64", the velocity value "78" of the fifth key-on event data is incremented to "79", the velocity value "91" of the sixth key-on event data is incremented to "92", and the velocity value "42" of the seventh key-on event data is incremented to "43".

At step 3D, which is taken when the negative (NO) determination results at step 36 that the data extracted out of the MIDI data train is not key-on event data, it is further determined whether the extracted data is program change event data PCM. If the extracted data is program change event data PCM, the program proceeds to next step 3H; otherwise, the program goes to step 3E.

At step 3E, which is taken when the negative determination results at step 3A or 3D or when the operation of step 3C is completed, it is determined whether the extracted data is one indicating that next data represents the end of the MIDI data train. With an affirmative determination, the electronic information imparting process is terminated, while with a negative determination, the program moves on to next step 3F. At step 3F, a determination is made as to whether a set of the operations at steps 33 to 3F has been completed eight times, i.e., for all the eight bits. If answered in the affirmative at step 3F, the program proceeds to next step 3G; otherwise, the program loops back to step 35 in order to repeat the operations of steps 35 to 3E for a next bit set in the byte register BR.

At step 3G, a determination is made as to whether the set of the operations at steps 33 to 3F has been completed for all the bytes constituting the electronic signature data. If answered in the affirmative, the program proceeds to next step 3H, but if answered in the negative, the program loops back to step 33 in order to repeat the operations of steps 33 to 3F for a next byte of the electronic signature data.

At step 3H, which is taken when the affirmative determination results at step 3G that the set of the operations at steps 33 to 3F has been completed for all the bytes of the electronic signature data, an electronic signature pointer is set to point to the beginning of the signature data and the program loops back to step 33 in order to again execute operations for writing the electronic signature data. In this manner, data obtained by converting the individual bits of the signature data in accordance with a predetermined algorithm are embedded dispersedly in the velocity byte sections of key-on event data across the MIDI data train. Note that the operation of this step 3H is also executed when the affirmative determination results at step 3D that the extracted MIDI data is program change event data PCM. Therefore, whenever program change event data PCM occurs, the electronic signature byte pointer is moved back to the beginning of the electronic signature data.

The reason why the electronic signature byte pointer is restored to the beginning of the electronic signature data in response to each occurrence of the program change event data PCM is as follows. The program change event occurs less frequently as compared to the note-on event requiring impartment of an electronic signature and normally leads to a change from one musical instrument to another after the change; therefore, each program change event can be said to be a particular point at which editing is very likely to be initiated.

Figure 4:
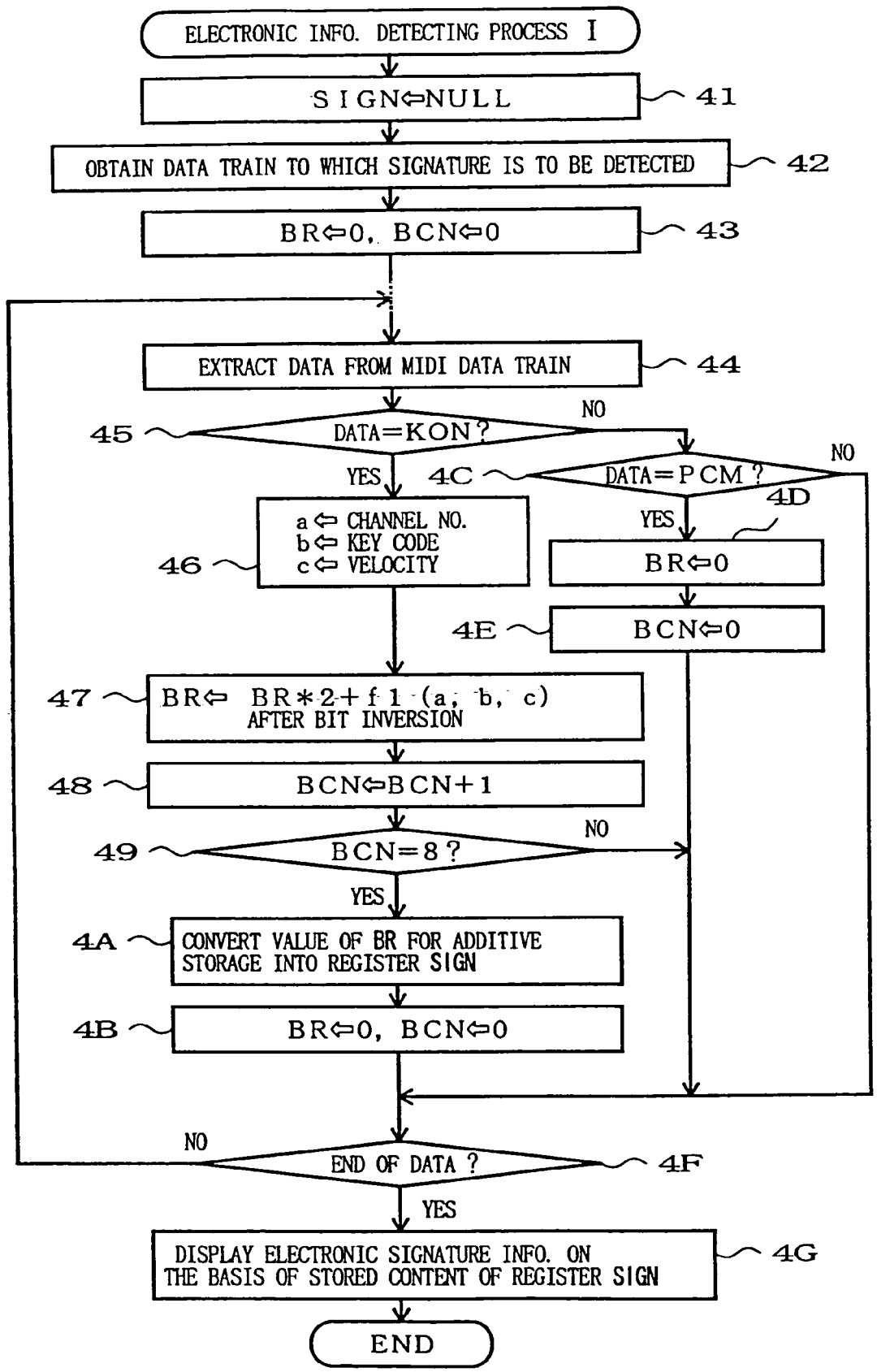
FIG. 4 is a flowchart showing an example of the electronic information detecting process executed in the case where the electronic musical instrument of FIG. 2 operates as the electronic information processing system.

Next, with reference to FIG. 4, a detailed description will be made about a process for detecting electronic information, i.e., electronic signature, imparted by the electronic information imparting process of FIG. 3. FIG. 4 is a flowchart showing an example of an electronic information detecting process ("electronic information detecting process I") executed in the case where the electronic musical instrument 1 operates as the electronic information imparting device.

Assume here that electronic signature data (i.e., copyright indication data) are recorded dispersedly in the velocity byte sections across a MIDI data train read out from a floppy disk via the floppy disk drive 25, as part of its header information. The following will describe operations for detecting such copyright indication data and visually displaying the detected data on a monitor or the like.

First, at step 41 of electronic information detecting process I, null data is set into a signature data register SIGN; that is, the signature data register SIGN is reset.

Next step 42 takes out a MIDI data train from which an electronic signature is to be detected, i.e., a MIDI data train having an electronic signature imparted by the electronic information imparting process of FIG. 3.

Then, at step 43, the byte register BR and bit counter BCN are both reset.

At following step 44, various MIDI data, such as key-on event data, program change data and control change data, are sequentially extracted out of the MIDI data train (Standard MIDI File: SMF).

At next step 45, a determination is made as to whether the currently extracted MIDI data is key-on event data KON. If answered in the affirmative (YES), the program proceeds to next step 46; otherwise, the program branches to step 4C. Thus, if the MIDI data extracted at step 44 is key-on event data KON, there is obtained a key-on event MIDI data train SMF2 as denoted at block (G) of FIG. 1; the key-on event data train is identical to the key-on event data train, denoted at block (D) of FIG. 1, having an electronic signature imparted thereto earlier.

At step 46, respective data of the individual bytes of the key-on event data are stored into corresponding registers a, b and c; that is, a channel number in the key-on states byte is stored into register a, a key code in the first data byte (key code byte) into register b, and velocity data in the second data byte (velocity byte) into register c.

At next step 47, the value stored in the byte register BR is multiplied by two (shifted leftward) and then an inverted value of "function f1(a, b, c)=(a+b+c) mod 2" is added to the least significant (lowermost) bit of the multiplied value. Then, the value in the bit counter BCN is incremented by one at step 48, and it is determined whether the incremented value in the bit counter BCN has reached "8". If answered in the affirmative at step 49, the program proceeds to step 4A; otherwise, the program jumps to step 4F.

For example, in the case of the key-on event MIDI data train SMF2 as denoted at block (G) of FIG. 1, data corresponding to a single letter is created with eight key-on event data. By arithmetically operating the individual key-on data with the predetermined function f1(a, b, c), there is obtained a data train as denoted at block (H) of FIG. 1. Namely, if the sum (a+b+c) is an even number, a value "0" is given, while if the sum (a+b+c) is an odd number, a value "1" is given. These values are then inverted and sequentially shift the byte register BR so that values as denoted at block (J) are ultimately set in the register BR.

The thus-obtained data of block (J) are identical to those of block (F) of FIG. 1. Namely, the copyright indication data written dispersedly in the velocity byte sections across the MIDI data train as denoted at block (F) have now been reproduced as shown at block (J) of FIG. 1.

At next step 4A, the stored value in the byte register BR is converted into ASCII letter data to be additively stored into the signature data register SIGN.

Then, at step 4B, the byte register BR and bit counter BCN are both reset.

At step 4C, which is taken when the negative (NO) determination results at step 45 that the data extracted out of the MIDI data train is not key-on event data, it is further determined whether the extracted data is program change event data PCM. If the extracted data is program change event data PCM (YES), the program proceeds to next steps 4D and 4E; otherwise (NO), the program goes to step 4F.

At step 4D, which is taken when the negative determination results at step 49 or 4C or when the operation of step 4B or 4E is completed, it is determined whether the data extracted at step 46 is one indicating that next data represents the end of the MIDI data train. With an affirmative determination, the program goes to step 4G, while with a negative determination, the program loops back to step 44.

At step 4G, the electronic signature information detected on the basis of the stored contents of the signature data register SIGN is visually displayed on a display or the like.

The electronic information imparting process and electronic information detecting process have been described above in relation to the case where key-on event data are sequentially extracted from a MIDI data train and electronic signature data are sequentially stored in correspondence with the extracted key-on event data. However, in not a few cases, the editing needs to be conducted on a channel-by-channel basis, and hence a description will be made about such a case where the electronic signature data are stored on the channel-by-channel basis.

Figure 5:
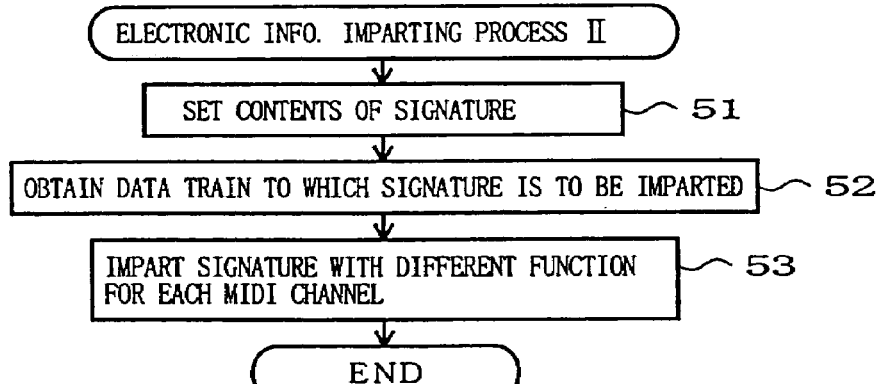
FIG. 5 is a flowchart showing another example of the electronic information imparting process executed in the case where the electronic musical instrument of FIG. 2 operates as the electronic information processing system.

FIG. 5 is a flowchart showing another example of the electronic information imparting process ("electronic information imparting process II") executed in the case where the electronic musical instrument 1 operates as the electronic information imparting device. In this example as well, the electronic musical instrument 1 operates to dispersedly attach electronic signature data (i.e., copyright indication data) to MIDI data, read out from a floppy disk via the floppy disk drive 25, as part of its header information.

At steps 51 and 52, which are similar to steps 31 and 32 of FIG. 3, contents of electronic signature data (copyright indication data) to be dispersedly written in the MIDI data train are designated, and, a data train relating to the electronic signature is obtained.

At next step 53, the operations of steps 33 to 3H in FIG. 3 are executed on the channel-by-channel basis, at which time the arithmetic operation based on the predetermined function is made different from one channel to another. For example, the function f1(a, b, c)=(a+b+c)mod2, which is stored in the second bit flag BF2, may be used as a first functional operation, and any suitable one of the first functional operation and second, third and fourth functional operations as stated below may be used selectively for each of the channels:

second functional operation: $f2(a, b, c)=(a+c)\mod 2$;

third functional operation: $f3(a, b, c)=(b+c)\mod 2$ and fourth functional operation: $f4(a, b, c)=(c)\mod 2$ At step 53, for each of the channels, one of the first to fourth functional operations is selected so as to impart electronic signature data converted in accordance with the selected functional operation through the operations of steps 33 to 3H of FIG. 3.

By conducting a different functional operation for each of the channels, there is afforded the benefit that even when an editing operation involving a simultaneous alteration of individual information, such as one involving substitution of channel information or key code shift, has been conducted, the electronic signature data can be restored sequentially for each of the channels that is not related to the data altered by the editing.

Figure 6:
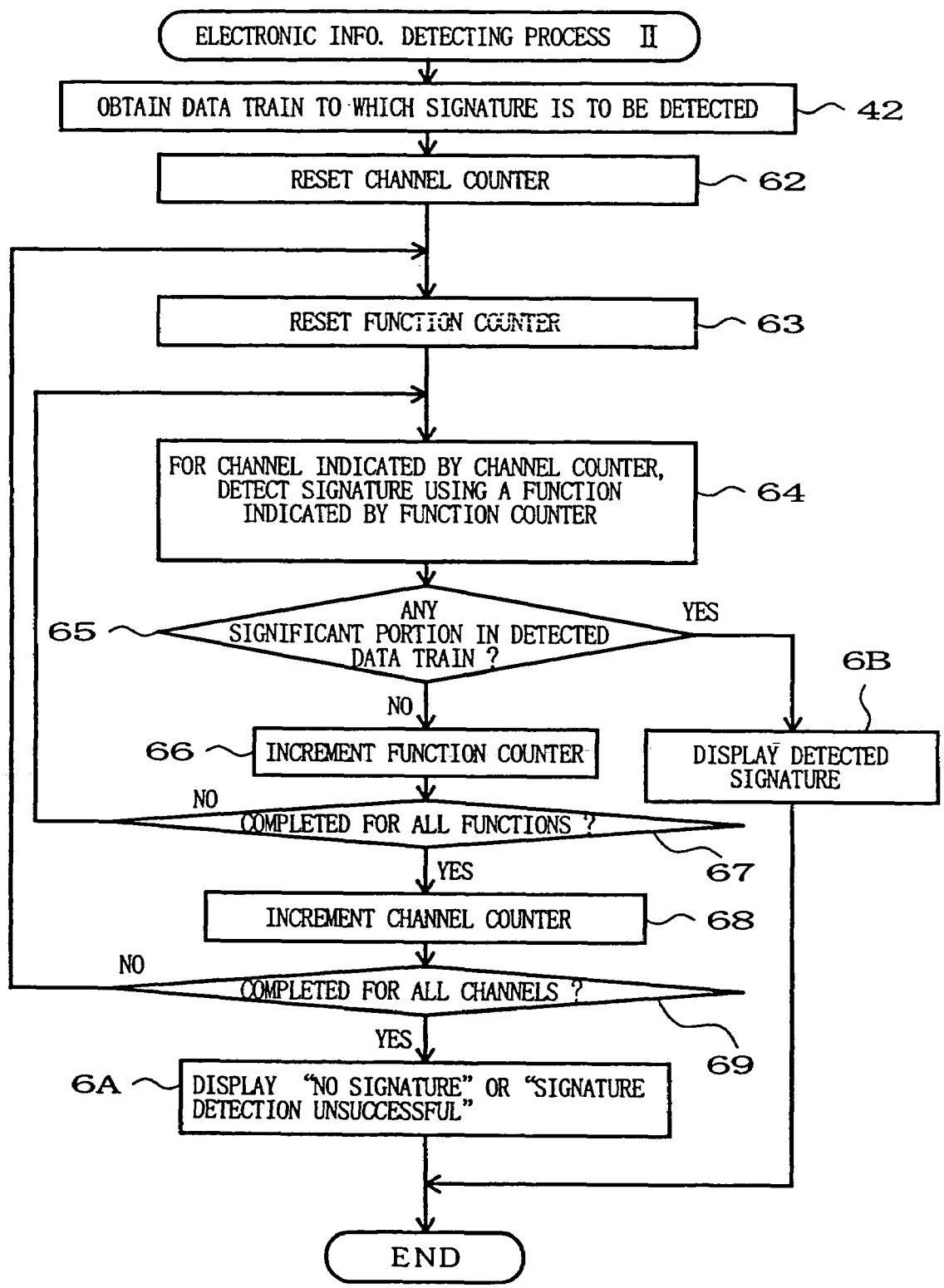
FIG. 6 is a flowchart showing another example of the electronic information detecting process executed in the case where the electronic musical instrument of FIG. 2 operates as the electronic information processing system.

Now, with reference to FIG. 6, a description will be made about electronic information detecting process II for detecting electronic information, i.e., electronic signature data imparted by electronic information imparting process II of FIG. 5. FIG. 6 is a flowchart showing another example of the electronic information detecting process executed in the case where the electronic musical instrument 1 operates as the electronic information imparting device.

In this case, assume that for each of the channels using any one of the first to fourth functional operations, electronic signature data, i.e., copyright indication data, are recorded dispersedly in the velocity byte sections across a MIDI data train read out from a floppy disk via the floppy disk drive 25 as part of its header information. The following will describe operations for detecting such copyright indication data dispersedly recorded through a predetermined functional operation and visually displaying the detected data on a monitor or the like.

First, step 61 takes out a MIDI data train from which an electronic signature is to be detected, i.e., a MIDI data train having an electronic signature imparted by the electronic information imparting process of FIG. 5, for each of the channels, in accordance with a predetermined functional operation.

Then, a channel counter is reset at step 62, and a function counter is reset at step 63. Here, the channel counter and function counter are used to execute the functional operation for each of the channels in a subsequent process. For example, where there are 16 MIDI channels, the channel counter is operated to cyclically count from "0" to "15". Further, where there are four functional operations to be selected as earlier noted, the function counter is operated to cyclically count from "0" to "3". If the function counter is at the value "0", this indicates the first functional operation f1(a, b, c)=(a+b+c)mod2; if the function counter is at the value "1", this indicates the second functional operation f2(a, b, c)=(a+c)mod2; if the function counter is at the value "2", this indicates the third functional operation f3(a, b, c)=(b+c)mod2; and if the function counter is at the value "3", this indicates the fourth functional operation f4(a, b, c)=(c)mod2.

At step 64, for the channel indicated by the channel counter, electronic signature detecting operations similar to those of steps 41 to 4F in FIG. 4 are executed using the functional operation indicated by the function counter.

At following step 65, a determination is made as to whether the detected data train includes any significant portion that is part of signature data "COPYRIGHT" comprised of ASCII letter data. Thus, step 65 ascertains whether or not the letter data "COPYRIGHT" is present in the ASCII letter data train sequentially added to the signature data register SIGN through the electronic information detecting process of FIG. 4. If the signature data register SIGN does not contain such a significant portion as determined at step 65 (NO), then the program proceeds to step 66 in order to increment the function counter by one. Then, at next step 67, a determination is made as to whether the signature data extracting operations of steps 64 and 65 have been completed for all the functional operations. If so, the program moves on to step 68, but if not, the program loops back to step 64 in order to repeat the operations of steps 64 and 65 for the next functional operation. In the event that the signature data register SIGN contains any significant portion as determined at step 65 (YES), the program goes to step 6B in order to visually display the detected electronic signature data on a monitor and then terminates the electronic information detecting process.

At step 68, the channel counter is incremented by one. Then, at next step 69, a determination is made as to whether the signature data extracting operations of steps 64 and 65 have been completed for all the channels. If so, the program moves on to step 6A, but if not, the program loops back to step 63 in order to repeat the operations of steps 63 to 65 for the next MIDI channel. The affirmative determination at step 69 means that the signature data extracting operations have been completed for all the MIDI channels using all the functional operations to find that no significant portion is present in the data train, and as a result, step 6A visually displays on the monitor letters such as "No electronic signature" or "Electronic signature detection unsuccessful".

Note that in a tone reproduction performance based on MIDI data, partly altered velocity data may be reproduced to be used directly for the performance. The least significant bit of the velocity data being incremented by one does not influence the reproducing accuracy so much. Of course, it is possible to reproduce accurately reproduce the partly altered velocity data with any error, caused by the signature data, removed from the velocity data.

Whereas the description has been made about the case where the signature data are dispersedly recorded in the velocity byte sections across the MIDI data train, this is just illustrative, and other additional description data, such as letter data representative of the author, title of a music piece or title of image or data format employed, may be dispersedly recorded.

Further, such additional description data may be dispersedly recorded in the duration time sections in place of or in addition to the velocity byte sections. In the case where the additional description data are dispersedly recorded in both the velocity sections and the duration time sections, exact locations where the additional description data are to be recorded may be varied as necessary depending on the degree of data accuracy, i.e., degree in which the contents of the data are varied by the disperse recording. More specifically, although it is not preferable to dispersedly record in such duration time sections where the duration time is relatively short because of increased variation degree (degree of data accuracy), dispersed recording of the additional description data will not have a significant influence in those duration time sections where the duration time is relatively long. Likewise, although it is not preferable to dispersedly record in such velocity sections where the velocity value is relatively small because of increased variation degree (degree of data accuracy), dispersed recording of the additional description data will not have a significant influence in those velocity sections where the velocity value is relatively great. Therefore, it is preferable that various necessary data be dispersedly recorded taking these conditions into account.

While the description has been made about the case where the additional description data are dispersedly recorded in the MIDI data train, they may be dispersedly recorded other data such as waveform data, sequence data, digitally recorded sound data, image data, animation data, registration (recorded settings of the musical instrument) data, etc.

Where the additional description data are to be recorded into waveform data, the predetermined functional operation may be modulo 2 of the waveform data (wave_data), i.e., f1(wave_data)=wave_data mod2. Alternatively, the predetermined functional operation may be modulo 2 of a sum of the values of the waveform data and its sample point data, i.e., f2(wave_data, sample_point)=(wave_data+sample_point).

Also, whereas the processes of FIGS. 5 and 6 have been described above in relation to the case where the signature data is detected with the functional operation changed for each of the (logical) channels, the functional operation may be changed each time program change data is detected as shown in FIGS. 3 and 4. In this case, it is necessary to determine whether the detected data train contains any significant portion, in response to detection of each program change data.

Further, whereas the preferred embodiments have been described as visually displaying the detected electronic signature information on the monitor, the data reproduction may be cancelled when no signature information is present or detected signature information can not be restored completely (i.e., when channels with and without detectable signature information exist mixedly). Further, where the electronic musical instrument or computer detecting the electronic signature information is connected to a communication network, a host computer may detect a message transmitted therefrom and indicating that wrongly edited data is present on the network.

Moreover, whereas the preferred embodiments have been described above in relation to the case where the electronic musical instrument operates as an electronic signature imparting device or electronic signature detecting device, the electronic signature imparting device or electronic signature detecting device of the present invention may be used in any other applications than an electronic musical instrument. The electronic signature imparting device or electronic signature detecting device of the present invention may be implemented by discrete hardware, software or a combination of DSP and microprograms. As another example, such an electronic signature imparting device or electronic signature detecting device may be provided in advance in the floppy disk drive, communication interface or the like so that electronic signature data are compulsorily imparted and detected at the data input/output stage.

Furthermore, a description has also been made above about the impartment of electronic signature data, but they may be supplied from a floppy disk or compact disk or electronically supplied via the communication network.

Whereas step 3B of FIG. 3 has been described as incrementing the velocity data value by one, the velocity data value may be descremented at step 3B, or the incrementing and decrementing of the velocity data value may be conducted alternately at suitable timing (e.g., at intervals corresponding to a predetermined number of data).

Moreover, whereas the preferred embodiments have been described above in relation to the case where the bit inversion is conducted after execution of the predetermined functional operation, this bit inversion may be omitted. It should be obvious that shifting between the upper and lower bits, logical operation such as AND, OR or XOR operation or the like may be conducted in place of the bit inversion operation. Also, an appropriate encrypting operation may be applied. For example, results of the above-mentioned first to fourth functional operations may be combined in any suitable manner, or a result of the last-conducted functional operation may be used in combination with a result of the current functional operation.

These operations may be executed in another manner than the above-mentioned as long as they are allowed to be conducted at a relatively high speed and restored to original conditions after conversion.

In addition, whereas the preferred embodiments have been described above in relation to the case where the signature data imparting process is newly conducted in response to each program change data, this process may be carried out in response to detection of each predetermined measure data (e.g., every eight measures). Also, where the additional description data are dispersedly recorded into waveform data, the signature data imparting process may be newly conducted once for every predetermined number of samples or every predetermined zero-cross point. Because, the zero-cross point, where the waveform value changes between plus and minus signs, is considered to be a basic point in editing the waveform.

Furthermore, the preferred embodiments have been described above as recording additional information such as signature data or title of the music piece. Where MIDI data and waveform data are recorded in combination, part of the waveform data may be recorded in the MIDI data or part of the MIDI data may be recorded into the waveform data.

Moreover, the preferred embodiments have been described above as recording signature data dispersedly in the velocity sections of MIDI data, but this is just illustrative, and any of various other electronic information may of course be dispersedly recorded, such as text information on the author's name, title of the music piece, title of image, etc., information relating to the data format, and information relating to commentary on the music piece, author, year of production, lyrics, hardware ID (model name of the device, OS employed, etc.) and the like. In this case, it is only sufficient that the processes of FIGS. 3 to 6 be carried out with the electronic signature replaced with the above-listed other electronic information.

Figure 7:
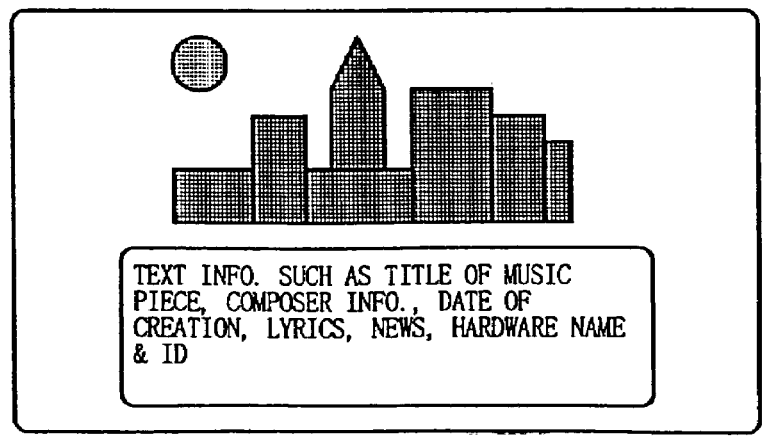
FIG. 7 is a diagram showing exemplary image information visually presented by a display circuit of the electronic musical instrument of FIG. 2.

The thus-process electronic information will be displayed on the monitor screen as shown in FIG. 7.

At that time, the additional information may be detected as a series of file information, or may be identified as a stream of electronic information detected from among MIDI data during an automatic so as to be displayed on the screen in real time. In this case, if the additional information is image information, images are drawn in real time on the basis of the MIDI data; if the additional information is text information, real-time information, such as the latest news, can be visually displayed. In addition, because the additional information imparting technique is very simple, electronic information can be embedded on demand or otherwise, so that real-time image drawing is possible via TV broadcasting or otherwise. The principle of the present invention is also applicable to delivery of ID or password via the Internet or electronic mail.

The preferred embodiments have been described above as dispersedly recording desired electronic additional information in the velocity sections of MIDI data; in such a case, however, the additional information itself could be lost and could not be reproduced due to the fact that the MIDI data are rewritten and the velocity data values are shifted as a whole. In view of such an inconvenience, other embodiments of the present invention will be described below which is capable of properly extracting additional information even when the MIDI data are rewritten.

Figure 8:
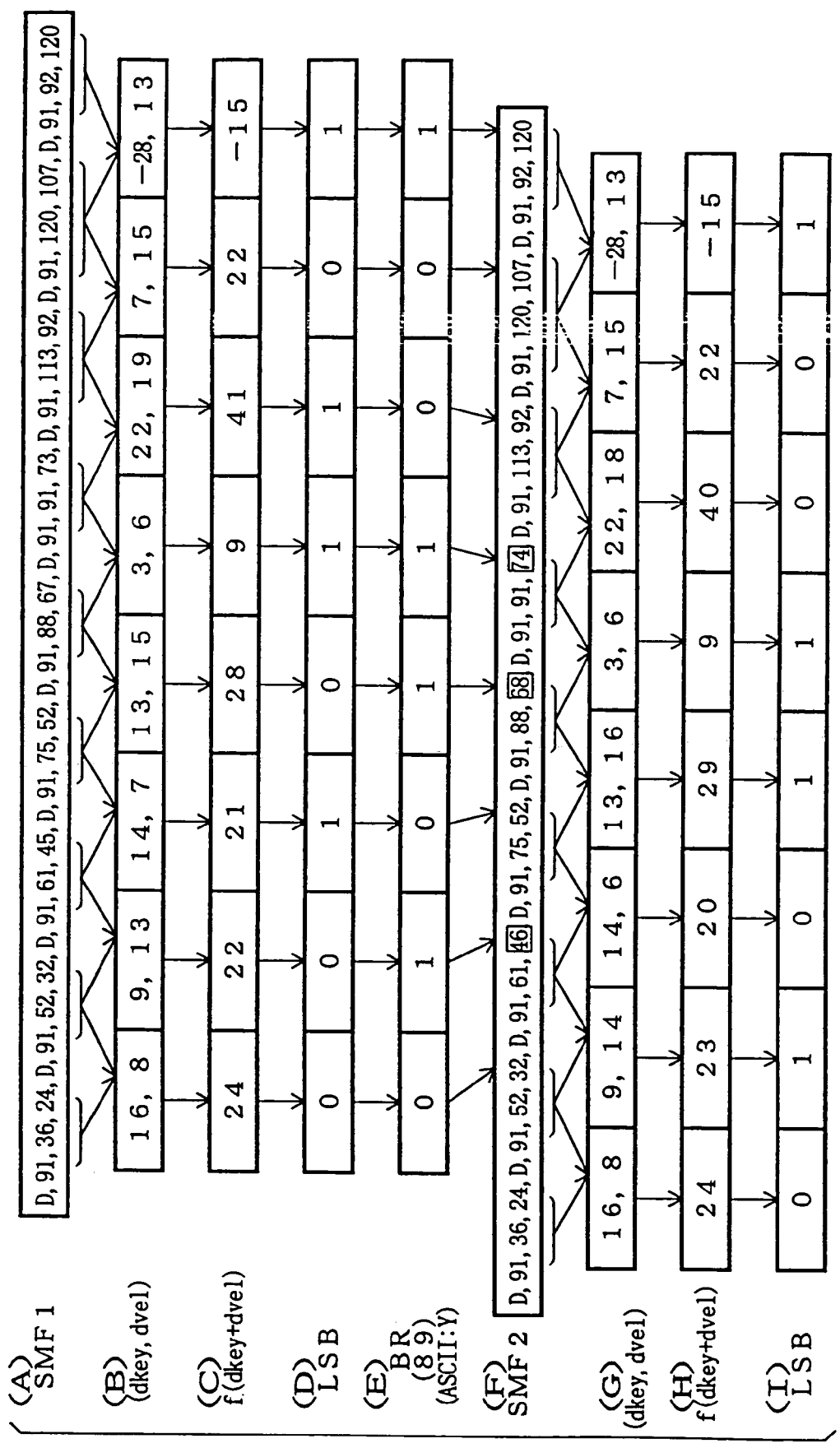
FIG. 8 is a diagram illustratively showing a specific manner in which data are converted by another embodiment of the electronic information processing system of the present invention.

FIG. 8 is a diagram showing in detail an exemplary manner in which data are converted via an electronic information imparting process by another embodiment of the electronic information imparting device and an electronic information detecting process by another embodiment of the electronic information detecting device. The control flows of these electronic information imparting process and electronic information detecting process are practically similar to those of FIGS. 3 and 4 and hence will be described here without resorting to visual illustration.

First, contents of electronic signature data (copyright indication data) to be dispersedly written in the MIDI data train are designated, and a data train corresponding to the electronic signature is obtained. Then, one byte of the ASCII data train is stored into the byte register BR. If "59H" (=Y) is stored in the byte register BR, it yields a bitstream "01011001B" (=89D) as denoted at block (E) of FIG. 8.

After that, various MIDI data, such as key-on event data, program change data and control change data, are sequentially extracted out of the MIDI data train (MIDI File: SMF). Namely, because the MIDI data train basically comprises key-on event data including a key-on status byte, key code byte and velocity byte, program change data and control change data as known in the art, these data are read out in a sequential manner. If the extracted MIDI data is key-on event data KON, there is obtained a MIDI data train including the key-on event data as denoted at block (A) of FIG. 8; this MIDI data train SMF1 comprises combinations of duration time data D and key-on event data.

Then, a difference between key code values in the key code bytes of every adjacent key-on event data is determined and stored into a key difference register dkey, and a difference between velocity values in the velocity bytes of every adjacent key-on event data is determined and stored into a velocity difference register dvel. In this case, the values of each preceding key-on event data are subtracted from the values of the preceding key-on event data, so as to determine the difference values. As a result, a difference value data train (dkey, dvel) is given as denoted at block (B) of FIG. 8. A predetermined functional operation of "f(dkey+dvel)" is performed on each pair of the key code and velocity values in the difference value data train; that is, the functional operation of "f(dkey+dvel)" is to calculate a sum of each key code difference dkey and corresponding velocity difference dvel. This calculation gives a functional operation data train "24, 22, 21, 28, 9, 41, 22, −15" as denoted at block (C) of FIG. 8. The stored individual values "01011001B" of the byte register BR (block (E)) are each added to the least significant or lowermost bit LSB of the functional operation data.

The electronic additional information imparting process is carried out in the following manner. First, corresponding bits of the functional operation data and stored value of the byte register BR are compared sequentially from the left; if the corresponding bits are equal to each other in value, next bits to the right are compared. If the next bits are not equal to each other, "1" is added to the velocity value of the latter of the two key-on event data corresponding to these bits, followed by a similar comparison between next bits, and so on. More specifically, in the example of FIG. 8, the least significant bit LSB and the leftmost bit of the byte register BR are equal to each-other, so that the second bits from the left are compared. Because the second bits from the left are not equal to each other, a value "1" is added to a velocity value "45" of the corresponding third key-on event data in the MIDI data train SMF1, so as to provide "46". When the velocity value of the third key-on event data is changed to "46" in this manner, the third difference value data (dkey, dvel) become "14" and "6" and the function f(dkey+dvel) becomes "20". As a result, the third least significant bit LSB is changed to "0", and then the third least significant bit LSB and the third bit of the byte register BR are compared. Because these third bits are found to be equal to each other, the comparison proceeds to the fourth bits. By executing the bit-to-bit comparison and addition of "1" to the velocity value in this manner, "1" is added to the fifth and sixth velocity values as well. Consequently, "1" is added to the third velocity "45", the fifth velocity "67" and the sixth velocity "73", so that the MIDI data train SMF1 denoted at block (a) is changed to the MIDI data train SMF2 denoted at block (F).

Extraction of the additional information from the MIDI data train SMF2 is conducted by obtaining a difference value data train (dkey, dvel) performing the functional operation f(dkey+dvel) on each of the values in the difference value data train and extracting the individual least significant bits, as noted above. That is, the difference value data train (dkey, dvel) as denoted at block(G) of FIG. 8 is obtained on the basis of the MIDI data train SMF2 denoted at block (F), and the functional operation data train as denoted at block (H) of FIG. 8 is obtained by performing the functional operation f(dkey+dvel) on each of the values in the difference value data train. Thus, the same additional information as denoted at block (E) is extracted from the MIDI data train SMF2.

By adding the additional information to the velocity difference values in the above-mentioned manner, the difference value information is maintained to thereby prevent undesirable alteration of the additional information.

To summarize, the above-described embodiment of FIG. 8 is characterized by the following arrangement. That is, when the least significant bits of the functional operation data denoted at block (D) of FIG. 8 are to be converted into data of the byte register BR denoted at block (E) of FIG. 8, the bit-to-bit comparison is carried out sequentially from the leftmost bit, in such a successive manner that the comparison proceeds to the next right bits if the two compared bits are found to be equal, and if the two compared bits are not equal, "1" is added to the latter of two key-on event data and the comparison proceeds to further right bits. However, as a modification, any other odd number than "1", such as "3" and "5", may be added to the velocity value, or the velocity value may be incremented or decremented progressively. Further, the bit-to-bit comparison may be carried out sequentially from the rightmost bit. In any event, the embodiment described in relation to FIG. 8 is just illustrative, any suitable software processing may be applied to the MIDI data train SMF1 as long as the lower bit train LSB as denoted at block (I) of FIG. 8 can be ultimately obtained.

Whereas the electronic information imparting process of FIG. 5 has been described above as restoring electronic signature data sequentially for each of the channels that is not related to the data altered through editing even when even when the editing operation involving a simultaneous alteration of individual information, such as one involving substitution of channel information or key code shifting, has been conducted. Alternatively, a different operation may be performed for each of the channels in cases where differences between key code and velocity values as in the embodiment of FIG. 8.

For example, whereas the embodiment of FIG. 8 has been described in relation to the case where difference values are sequentially determined for the MIDI data train SMF1 of key-on event data and additional information is sequentially added to the determined difference values, the difference values may be classified into a predetermined number of groups (e.g., three groups) in accordance with the magnitude of the difference values so that operations similar to those of FIG. 8 are performed on the classified groups.

Namely, if the MIDI data train SMF1 of key-on event data is "D, 9n, 3c, 40, D, 9n, 3c, 7f, D, 9n, 3c, 10, D, 9n, 3c, 7f, D, 9n, 3c, 7f, D, 9n, 3c, 20, D, 9n, 3c, 50, D, 9n, 3c, 7f, . . .", then velocity difference values dvel will be "3f, −6f, 6f, 0, −5f, 30, 2f, . . . ". In this example, difference values "0" to "2f" are classified as the first group, difference values "30" to "5f" are classified as the second group, and difference values "60" to "7f" are classified as the third group. Thus, the fourth and seventh difference values are classified as the first group, the first and sixth difference values are classified as the second group, and the third difference value is classified as the third group. Negative differences values are ignored. By performing an additional information imparting process similar to the foregoing, the probability of the additional information in all the groups being altered will be the third power of ½, i.e., 12.5%, which means that the probability of at least one bit being left unaltered will be 87.5%.

Thus, even in a case where all the data are multiplied by coefficient "a", the probability of the additional information being altered is very low, so that original contents of the additional information can be kept unaltered, which can properly deal with the alteration of the additional information.

As apparent from the above description, even when additional information attached to main information such as music data, image data or waveform data is deleted or altered, the present invention can appropriately reproduce the deleted or altered additional information.

What is claimed is:

1. A method of embedding additional data in performance data to be used for reproduction of a music piece and storing the performance data and additional data in a readable form, said method comprising:

a supply step of supplying performance data, said performance data comprising a plurality of kinds of event data, each of the event data representing any one of a plurality of kinds of processing instructions;

an extraction step of extracting, from among the performance data supplied by said supply step, one or more particular kinds of event data; and a change step of sequentially changing the particular kinds of event data extracted by said extraction step, in accordance with a predetermined algorithm and using additional data to thereby embed the additional data into the performance data.

2. A method as recited in claim 1 wherein said one or more particular kinds of event data contains a plurality of kinds of processing instructions and said change step changes a particular one of the processing instructions contained in said one or more particular kinds of event data of the performance data.

3. A method as recited in claim 2 wherein the particular processing instruction is an instruction for controlling a tone generating time.

4. A method as recited in claim 1 wherein each of the performance data has a value as digital data and each of the additional data also has a value as digital data, and wherein said change step includes a step of determining, on the basis of the values of the additional data and performance data, which of said one or more particular kinds of event data should be changed.

5. A method as recited in claim 1 wherein the performance data comprise a plurality of the event data arranged in a time series and each of the event data has a value as digital data, and wherein said change step includes a step of determining, on the basis of the values of individual ones of said event data arranged in a time series, which of said one or more particular kinds of event data should be changed.

6. A method as recited in claim 1 wherein said one or more particular kinds of event data includes data indicative of tone volume, and
wherein said change step changes the data indicative of tone volume included in said one or more particular kinds of event data, in accordance with the predetermined algorithm and using the additional data.

7. A method as recited in claim 1 wherein said one or more particular kinds of event data includes data for controlling a length of a tone to be generated, and
wherein said change step changes said data for controlling a length of a tone to be generated included in said one or more particular kinds of event data, in accordance with the predetermined algorithm and using the additional data.

8. A method as recited in claim 1 wherein said one or more particular kinds of event data represents one or more kinds of particular processing instructions.

9. A method as recited in claim 8 wherein, when said one or more particular kinds of event data represent at least two kinds of particular processing instructions, said change step changes the extracted particular kinds of event data representing the at least two kinds of processing instructions, in accordance with algorithms differing between the at least two kinds.

10. A method as recited in claim 8 wherein said performance data are MIDI data and said plurality of kinds of event data include at least velocity data and duration data, and wherein, when said one or more particular kinds of event data represent at least two kinds of particular processing instructions, the extracted particular kinds of event data representing the at least two kinds of particular processing instructions to be changed by said change step include velocity data and duration data.

11. A method as recited in claim 1 wherein said plurality of kinds of event data includes one or more kinds of event data that need be accurate and one or more kinds of event data that need not be accurate, and
wherein said extraction step extracts, in accordance with a predetermined degree of data accuracy, from said plurality of kinds of event data included in the performance data supplied by said supply step, part of the one or more kinds event data that need not be accurate as said one or more particular kinds of event data.

12. A method as recited in claim 1 wherein said change step includes a step of extracting part of the additional data to be embedded and said change step changes the particular kinds of event data using the extracted part of the additional data.

13. A method as recited in claim 1 wherein said change step is repeated until necessary processing is completed for all contents of the additional data to be embedded.

14. A method as recited in claim 1 wherein said change step repeats, a plurality of times, the necessary processing for the all contents of the additional data to be embedded, whereby plural sets of the additional data of same contents are embedded redundantly.

15. A method as recited in claim 1 wherein said change step identifies any one of the processing instructions included in the performance data supplied by said supply step and makes a change to the event data representing the identified processing instruction in the supplied performance data.

16. A method as recited in claim 1 wherein the performance data in which the additional data are embedded are data complying with MIDI standards.

17. A method as recited in claim 1 wherein said change step changes data of predetermined lower bits of the particular kinds of event data to be changed by the additional data, using the additional data.

18. A method as recited in claim 1 wherein said performance data supplied by said supply step are MIDI data, and wherein said change step changes velocity data in the particular kinds of event data included in said MIDI data in accordance with the predetermined algorithm and using the additional data.

19. A method as recited in claim 1 wherein said performance data supplied by said supply step are MIDI data, and wherein said change step changes duration data in the particular kinds of event data included in said MIDI data in accordance with the predetermined algorithm and using the additional data.

20. A method of reproducing additional data embedded in performance data, said method comprising:
a reception step of receiving performance data having additional data embedded therein, said performance data comprising a plurality of kinds of event data, each of the event data representing any one of a plurality of kinds of processing instructions, one or more particular kinds of event data in the performance data being changed by the additional data;
an extraction step of sequentially extracting said one or more particular kinds of event data from among the received performance data, and reading out data of a predetermined portion of the extracted event data; and
a reproduction step of reproducing the additional data on the basis of the data of the predetermined portion read out by said extraction step.

21. A method as recited in claim 20 wherein said performance data received by said reception step is data which is read out from a memory.

22. A method as recited in claim 20 wherein said performance data received by said reception step are data which has been received via a communication line.

23. A method as recited in claim 20 wherein said one or more particular kinds of event data contains a plurality of kinds of processing instructions and a particular one of the processing instructions included in the one or more particular kinds of event data in the performance data is changed by the additional data.

24. A method as recited in claim 20 wherein each of the performance data has a value as digital data and each of the additional data has a value as digital data, and wherein a portion of the one or more particular kinds of event data in the performance data which is changed by the additional data is determined on the basis of the values of the additional data and performance data.

25. A method as recited in claim 20 wherein the performance data comprise a plurality of the event data arranged in a time series and each of the event data has a value as digital data, and wherein a portion of the one or more particular kinds of event data in the performance data which is changed by the additional data is determined on the basis of the values of individual ones of said event data arranged in a time series.

26. A method as recited in claim 20 wherein said one or more particular kinds of event data contains a plurality of kinds of processing instructions including an instruction for controlling a tone generating time, and wherein a portion of the one or more particular kinds of event data in the performance data which is changed by the additional data is said processing instruction for controlling a tone generating time.

27. A method as recited in claim 20 wherein said one or more particular kinds of event data includes data indicative of tone volume, said data indicative of tone volume being changed by the additional data, and
   wherein said reproduction step reproduces the additional data on the basis of the data indicative of tone volume.

28. A method as recited in claim 20 wherein said one or more particular kinds of event data includes data for controlling a length of a tone to be generated, said data for controlling a length of a tone to be generated being changed by the additional data, and
   wherein said reproduction step reproduces the additional data on the basis of said data for controlling a length of a tone to be generated.

29. A method as recited in claim 20 wherein said one or more particular kinds of event data being changed by the additional data represents one or more kinds of processing instructions, and
   wherein, when said one or more particular kinds of event data represent at least two kinds of particular processing instructions, said reproduction step performs, for each of said at least two kinds of processing instructions represented by said event data being changed by the additional data, an arithmetic operation on data of the processing instruction in accordance with a predetermined algorithm and reproduces said additional data on the basis of a result of said arithmetic operation.

30. A method as recited in claim 29 wherein the predetermined algorithm used in said reproduction step differs depending on the kind of the processing instruction.

31. A method as recited in claim 29 wherein said performance data are MIDI data and said plurality of kinds of event data include velocity data and duration data, and at least one of the velocity data and duration data is changed by the additional data.

32. A method as recited in claim 20 wherein said plurality of kinds of event data includes one or more kinds of event data that need be accurate and event data that need not be accurate, part of the one or more kinds of event data that need not be accurate corresponding to said one or more particular kinds of event data and being changed by additional data, and
   wherein said extraction step sequentially extracts from said plurality of kinds of event data included in the performance data supplied by said supply step, said one or more kinds of event data that need not be accurate as said one or more particular kinds of event data and reads out the data of the predetermined portion of the extracted event data, and
   wherein said reproduction step performs an arithmetic operation on the basis of the read out data of the predetermined portion and in accordance with said predetermined algorithm, and then reproduces the additional data on the basis of a result of said arithmetic operation.

33. A method as recited in claim 20 wherein all contents of the additional data are embedded dispersedly in the performance data to be received by said reception step.

34. A method as recited in claim 20 wherein plural sets of the additional data of same contents are embedded redundantly in the performance data to be received by said reception step.

35. A method as recited in claim 20 wherein said performance data received by said reception step are MIDI data.

36. A method as recited in claim 20 which further comprises a display step of visually showing at least part of the additional data reproduced by said reproduction step.

37. A method as recited in claim 20 wherein the additional data are embedded in data of predetermined lower bits of the particular kinds of event data in the performance data to be received by said reception step.

38. A method as recited in claim 20 wherein the performance data in which the additional data are embedded are data complying with MIDI standards.

39. A method as recited in claim 20 wherein said performance data received by said reception step are MIDI data and velocity data in the particular kinds of event data included in said MIDI data have been changed by the additional data.

40. A method as recited in claim 20 wherein said performance data received by said reception step are MIDI data and duration data in the particular kinds of event data included in said MIDI data have been changed by the additional data.

41. An apparatus for embedding additional data in performance data to be used for reproduction of a music piece and storing the performance data and additional data in a readable form, said apparatus comprising:
   a performance data supply section that supplies performance data, said performance data comprising a plurality of kinds of event data, each of the event data representing any one of a plurality of kinds of processing instructions;
   an extraction section that extracts, from among the performance data supplied by said performance data supply section, one or more particular kinds of event data; and
   a change section that sequentially changes the particular kinds of event data extracted by said extraction section in accordance with a predetermined algorithm and using the additional data, to thereby embed the additional data into the performance data.

42. A machine-readable storage medium containing a group of instructions to cause said machine to implement a method of embedding additional data in performance data to be used for reproduction of a music piece and storing the performance data and additional data in a readable form, said method comprising the steps of:
   supplying performance data, said performance data comprising a plurality of kinds of event data, each of the event data representing any one of a plurality of kinds of processing instructions;
   extracting, from among the supplied performance data, one or more particular kinds of event data; and sequentially changing the extracted particular kinds of event data, in accordance with a predetermined algorithm and using additional data, to thereby embed the additional data into the performance data.

43. An apparatus for reproducing additional data embedded in performance data, said apparatus comprising:

a reception section that receives performance data having additional data embedded therein, said performance data comprising a plurality of kinds of event data, each of the event data representing any one of a plurality of kinds of processing instructions, one or more particular kinds of event data in the performance data being changed by the additional data;

an extraction section that sequentially extracts said one or more particular kinds of event data from among the received performance data, and reads out data of a predetermined portion of the extracted event data; and a reproduction section that reproduces the additional data on the basis of the data of the predetermined portion read out by said extraction section.

44. A machine-readable storage medium containing a group of instructions to cause said machine to implement a method of reproducing additional data embedded in performance data, said method comprising the steps of:

receiving performance data having additional data embedded therein, said performance data comprising a plurality of kinds of event data, each of the event data representing any one of a plurality of kinds of processing instructions, one or more particular kinds of event data in the performance data being changed by the additional data;

sequentially extracting said one or more particular kinds of event data from among the received performance data and reading out data of a predetermined portion of the extracted event data; and reproducing the additional data on the basis of the read-out data of the predetermined portion of the extracted event data.

* * * * *